United States Patent
Golborne et al.

(10) Patent No.: US 8,290,030 B2
(45) Date of Patent: Oct. 16, 2012

(54) MICRO-CONTROLLER WITH FSK MODEM

(75) Inventors: Carlos Golborne, Redmond, WA (US); Jay Tannenhaus, Bellevue, WA (US)

(73) Assignee: Spectrum Controls, Inc., Bellevue, WA (US)

( * ) Notice: Subject to any disclaimer, the term of this patent is extended or adjusted under 35 U.S.C. 154(b) by 821 days.

(21) Appl. No.: 12/345,393

(22) Filed: Dec. 29, 2008

(65) Prior Publication Data

US 2009/0168857 A1    Jul. 2, 2009

Related U.S. Application Data

(60) Provisional application No. 61/017,466, filed on Dec. 28, 2007.

(51) Int. Cl.
*H04B 1/38* (2006.01)
*H04L 5/16* (2006.01)
*H04L 27/10* (2006.01)
*H04L 27/18* (2006.01)

(52) U.S. Cl. ...................................................... 375/223

(58) Field of Classification Search .................. 375/328, 375/335, 226, 354, 334, 272, 316, 216, 223, 375/303; 455/234.2, 226.1, 240.1, 296

See application file for complete search history.

(56) References Cited

U.S. PATENT DOCUMENTS

| | | | |
|---|---|---|---|
| 5,339,333 A | 8/1994 | Zehngut | |
| 5,684,837 A | 11/1997 | Chen | |
| 5,834,930 A * | 11/1998 | Hung et al. | 324/76.58 |
| 7,020,187 B1 | 3/2006 | Reid | |
| 2003/0014200 A1 * | 1/2003 | Jonker et al. | 702/60 |
| 2004/0008798 A1 | 1/2004 | Tsui | |
| 2004/0113814 A1 | 6/2004 | Lochner | |
| 2007/0053466 A1 | 3/2007 | Klostermann | |
| 2007/0092022 A1 | 4/2007 | Krafft | |
| 2007/0133715 A1 | 6/2007 | Juang | |
| 2008/0151973 A1 * | 6/2008 | Calvin | 375/216 |

OTHER PUBLICATIONS

Texas Intruments, "FSK Modulation and Demodulation with the MSP430 Microcontroller", 1998, Texas Intruments Incorporated.*
Amis-30585, "Amis-30585 S-FSK PLC modem", Jun. 2005, Amis Semiconductor Rev. 90.*
Roelofs, "A FSK Modem for the Map Protocol", Dec. 1987, Electrical Engineering of the TUE, at the group pf EB in coorporation with philips, CAB Elcoma.*
Texas Instruments, FSK Modulation and Demodualtion with MSP430 Microcontroller, 1998, Texas Instruments.*
Amis-30585 S-FSK PLC Modem data sheet, Amis-30585 S-FSK PLC Modem, Jun 2005, AMI Semiconductor.*
Eric Roelofs, A FSK Modem for the Map Protocol, Dec. 1987, Electrical Engineering of the TUE at the gorup of EB in coorperation with Philips, CAB Elcoma.*
International Search Report mailed Jul. 28, 2009, issued in corresponding International Application No. PCT/US2008/088471, filed Dec. 29, 2008.

* cited by examiner

*Primary Examiner* — David C. Payne
*Assistant Examiner* — Wednel Cadeau
(74) *Attorney, Agent, or Firm* — Christensen O'Connor Johnson Kindness PLLC

(57) ABSTRACT

A micro-controller to perform the FSK (HART) modem functions as well as communications and control functions in an isolated channel implementation is described. In one embodiment, the micro-controller comprises: a processor, an analog-to-digital converter configured to transform received analog signals into digital values at a predetermined digital sample rate; and a memory unit containing a set of computer-executable instructions that, when executed on the processor, provide a built-in FSK bi-directional modem function that converts the received digital values into binary signals. The FSK (HART) demodulation function is performed by the micro-controller with the built-in FSK modem function in three sequential phases implemented in computer code: (1) zero crossing and amplitude detection; (2) bit stream and timing generation, and (3) character generation and bit synchronization.

5 Claims, 5 Drawing Sheets

MICRO-CONTROLLER WITH FSK MODEM

CROSS-REFERENCE TO RELATED APPLICATION

This application claims the benefit of U.S. Provisional Application No. 61/017,466 filed Dec. 28, 2007, which application is incorporated herein by reference in its entirety.

BACKGROUND

A programmable logic controller (PLC) is a digital computer typically configured to automate mechatronic processes, such as control of machinery on factory assembly lines, control of amusement rides, or control of lighting fixtures, etc. Those skilled in the art and others will recognize that PLCs are used in many different industries and machines such as packaging and semiconductor machines. Unlike general-purpose computers, a PLC is designed for multiple inputs and output arrangements, extended temperature ranges, immunity to electrical noise, and resistance to vibration and impact. Programs to control machine operation are typically stored in battery-backed or non-volatile memory. A PLC is an example of a real time system since output results are produced in response to input conditions within a bounded time, otherwise unintended operation will result.

An exemplary system environment 10 that employs FSK modems connected to PLCs is illustrated in FIG. 1. A system server 20, such as a desktop computer, is connected to a plurality of PLCs 30 through a network 40. The network 40 may be any type of known network, such as the Internet, LAN, WAN, or other type of network known in the art. Each of the PLCs 30 may be connected to a plurality of field devices 50, each field device providing analog data regarding particular industrial process or action. Field devices 50 may be, for example, pressure sensors that measure the pressure in an oil tank and provide the pressure data to the PLC; temperature sensors measuring the temperature of a particular substance, etc. In turn, PLCs 30 may provide instructions to field devices as an automated feedback in response to the data received from the field devices. The system server 20 typically controls overall automated process.

Field devices may provide data to PLCs in a variety of communication formats, such as formats that utilize the frequency-shift-keying technique (FSK). FSK, or frequency-shift keying, is a frequency modulation scheme in which digital information is transmitted through discrete frequency changes of a carrier wave. The simplest FSK is binary FSK (BFSK), which utilizes multiple discrete frequencies to transmit binary (0s and 1s) information. With this scheme, the "1" is called the mark frequency and the "0" is called the space frequency. The Highway Addressable Remote Transducer (HART) protocol is a type of FSK that will be described below in greater detail.

To facilitate data exchange between PLCs and field devices, FSK modems are used in PLC systems. Typically, FSK modems used in such systems incorporate the HART protocol. HART provides digital communication to microprocessor-based (smart) analog process control instruments. A HART modem is a type of FSK modem in which the frequency, bit format or frame, preamble and other physical parameters are specified along with a protocol for messaging between modems. FSK modems in PLCs are incorporated to send information using HART over inputs and outputs used to transmit and receive other analog information. An example would be an output of one PLC, which is transmitting a voltage to another PLC input wherein both PLCs incorporate FSK modems that are HART enabled. In addition to the voltage signal, a data signal can be superimposed on the voltage measurement that consists of serial characters used to denote other important data of merit. Examples of the data of merit include, for example, an ID of a machine or operation, and the like. For convenience, "FSK" and "HART" will be used interchangeably in the present application.

PLC modules can communicate with field devices, such as sensors or actuators, using the HART communications link that includes a physical and potentially multiple protocol layers. Normally, the physical layer of HART is based on using a 1200 Hz or 2200 Hz continuous phase tones to represent "ones" and "zeros," which is a type of FSK as described above. The tones are transmitted and received over a current or voltage loop, modulating the tone's amplitude, typically around 500 mV.

Typically, FSK modem functionality in PLCs is implemented using off-the-shelf Hart Modems, such as the A5191HRT modem by AMI Semiconductors or the HT2015 by Smar Research or the SYM20C15 by Symbios Logic.

A disadvantage of existing off-the-shelf modems is that they need to be connected to a universal asynchronous receiver/transmitter (UART). In this regard, a UART is a separate piece of computer hardware that translates data between parallel and serial forms in a micro-controller. This may require that at least one additional micro-controller be dedicated to the modem, adding cost and consuming within a PLC, or additional UARTs, also adding to cost and space.

The quality of the output tones generated by existing modems is poor, sometimes barely meeting the HART specification. Moreover, another disadvantage of existing off-the-shelf systems is the inability to add design elements for improving the quality of the FSK modem operation. Design elements that improve FSK modem operation may include, but are not limited to, electronic and software filters, adaptive control algorithms, and the like.

PLC inputs and/or outputs often are required to be electrically isolated from the power circuitry within the PLC system. A traditional PLC communication topology 28 employing a stand-alone HART modem is illustrated in FIG. 2A. The topology comprises a PLC main controller 30 connected to a field device 50 through an analog-to digital converter 68 and HART modem 65. Typically, this implementation requires an isolation barrier 60, for example, a transformer, to be located to isolate the HART modem signal 64 from the HART modem 65 to the PLC 30 as shown in FIG. 2A. This arrangement adds cost, consumes considerable space, and can further degrade HART output tones.

It is often desirable to have multiple FSK channels in a single PLC. In multi-channel modules the performance is low if the modem is shared by the channels. In case of isolated input/output channels each channel is isolated by a transformer if sharing a modem, or requires a modem per channel, adding to cost and board space.

Therefore, it would be beneficial to have a device that would obviate the need for one UART per FSK modem in a multi-channel design, increase the density and lower the cost of FSK channels, improve the FSK modem signal fidelity, and eliminate the need to share a modem in a multi-channel design.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A micro-controller to perform the FSK (HART) modem functions as well as communications and control functions in an isolated channel implementation is described. In one embodiment, the micro-controller comprises: a processor, an analog-to-digital converter configured to transform received analog signals into digital values at a predetermined digital sample rate; and a memory unit containing a set of computer-executable instructions that, when executed on the processor, provide a built-in FSK bi-directional modem function that converts the received digital values into binary signals.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The micro-controller with the built-in FSK modem function is described below. In one embodiment, the FSK modem function is implemented as a software solution, thereby eliminating the need for the hardware comprising a regular FSK, or HART, modem. The software solution may be hard-coded in the memory of the micro-controller for execution upon receipt of an input signal from a field device or output signal generated by the PLC and transmitted to the field device. The software solution, when executed, implements the functions of a zero crossing detector, a counter, and a comparator, among other functions, as described in further detail below.

Figure 1:
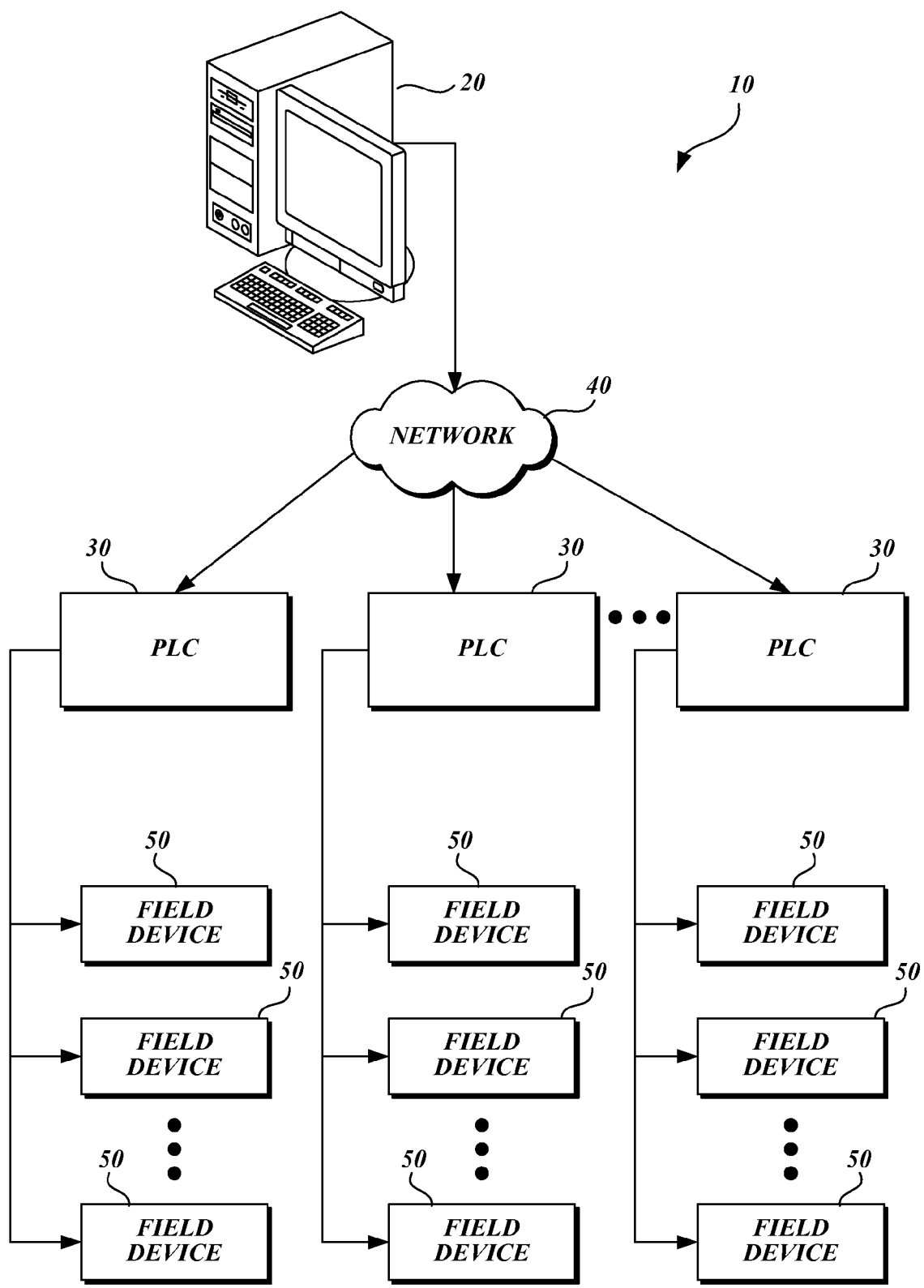
FIG. 1 illustrates an environment in which the micro-controller with software-implemented FSK modem may be implemented.
Figure 2A:
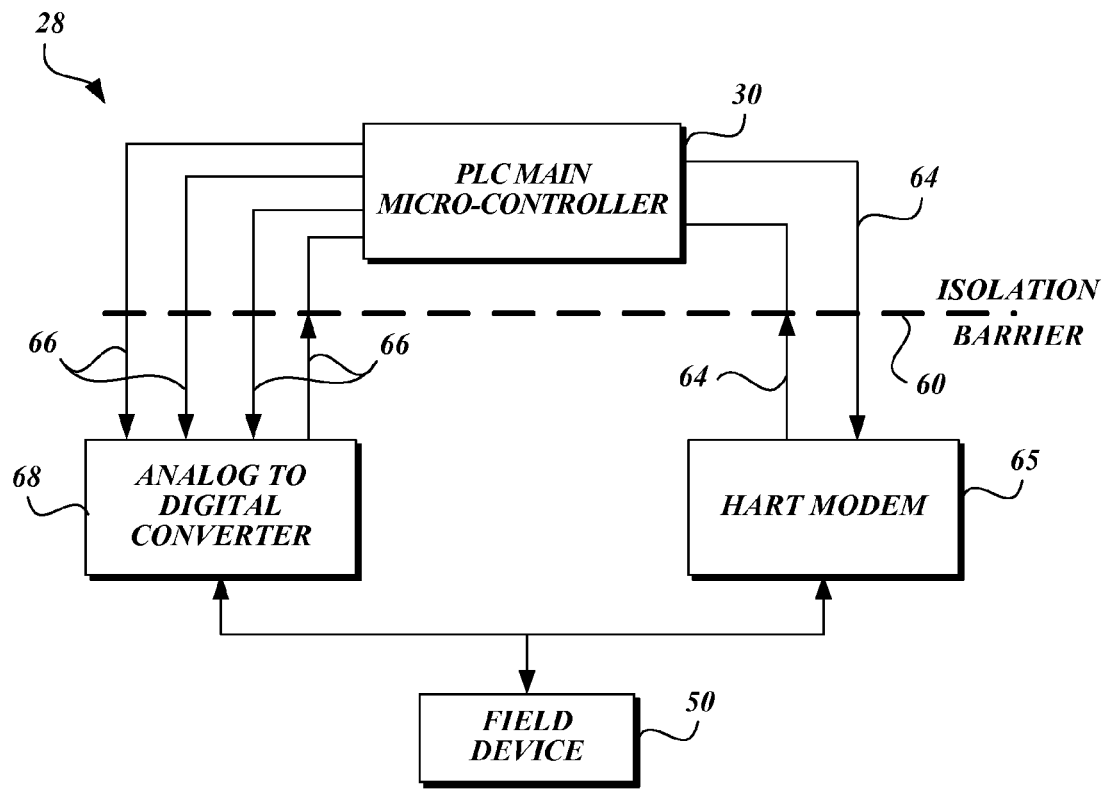
FIGS. 2A and 2B are block diagrams that illustrate a traditional PLC communication topology employing a stand-alone HART modem (FIG. 2A) and the disclosed PLC communication configuration employing a micro-controller with software-implemented FSK modem function (FIG. 2B)
Figure 2B:
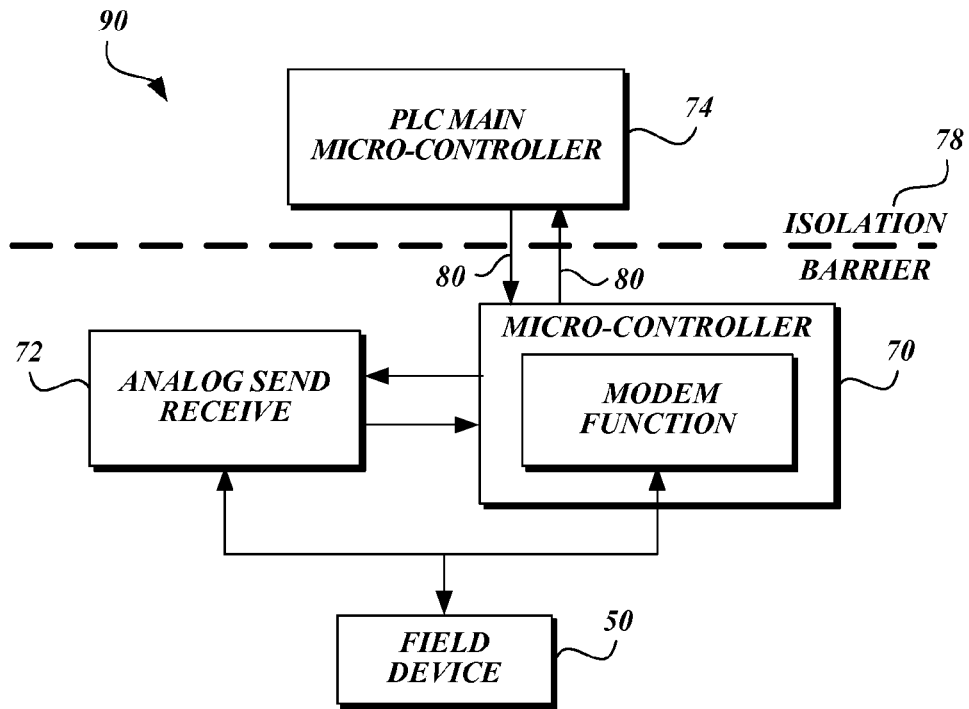

One embodiment of the input/output channel 90 that employs a micro-controller with the built-in FSK modem function is illustrated in FIG. 2B. The micro-controller with the built-in FSK modem function 70 may be placed on the isolated side of an input/output channel 90 and connected to a PLC backplane ASIC-connected main micro-controller 74. The isolation is facilitated by an isolation barrier 78, which may be implemented using any electronic device that provides a digital isolation function of preventing current flow yet allowing for data or power flow between two points. In one embodiment, the isolation barrier 78 may be a single bi-directional opto-isolator, but other devices may be used without departing from the scope of the claimed subject matter.

The main micro-controller 74 communicates with isolated input channels using bi-directional UART serial link 80 as shown in FIG. 2B. Those skilled in the art will recognize that the serial link 80 offers high speed data rates when compared to alternative solutions. The Analog Send Receive block 72 provides the "process variable" function to the micro-controller 70, as known to those skilled in the art.

Besides backplane communications, the main micro-controller 74 may also handle the upper layers of the HART protocol and communicate with each analog input or output via the same 8 bit micro-controller via the same UART serial link 80. This link also carries the HART data packets.

Each input/output channel 90, thus, may be supported by a micro-controller 70 that, besides performing analog input/output and control functions, also performs the functions of a HART Modem. The micro-controller 70 converts base board UART communications data packets into ADC serial communications, typically System Packet Interface (SPI) packets. In addition, the micro-controller 70 controls analog functions like gain and operating modes. As one skilled in the art will appreciate, each input-output channel 90 provides channel-to-channel isolation, and each channel is supported by its own DC-DC converter.

In one embodiment, the modem functions may be implemented in an Atmel ATmega48 using the micro-controller's built in peripherals. The micro-controller timing is defined by a precise crystal or resonator based clock generator, thus providing accurate derived timing to all processes, such as Pulse Width Modulation (PWM) counter clock and Analog to Digital Converter (ADC) sampling rate.

The current input/output channel implementation 90 that employs a micro-controller with software-implemented modem function maintains only two lines of communication in the serial link 80 across the isolation barrier 78 between a PLC main micro-controller 74 and a field device 50, as shown in FIG. 2B. In contrast, the traditional communication topology illustrated in FIG. 2A typically utilizes six communication lines 64 and 66 across the isolation barrier 60, namely, HART RX and HART TX (64), and SPI MOIS, SPI MISO, SPI SLK and SPI/CS (66), as known in the art. Thus, the disclosed subject matter allows for a higher level of signal processing resulting in improved signal detection and accuracy when receiving signals and improved signal output quality when in transmit mode.

With continuing reference to FIG. 2B, the transmit and receive modes of the micro-controller with the built-in FSK modem function will now be described.

In the transmit mode of an illustrative embodiment, the micro-controller 70 generates HART sine waves at 1200 and 2200 Hz using the 8 bit Timer Counter operating at 52.8 KHz. In one embodiment, sine wave generation is driven from two 8-bit sine look up tables of 44 and 24 points, respectively. The Pulse Width Modulated (PWM) output uses an external low pass filter to reduce the 52.8 KHz noise. The amplitude and phase response of the output filter can be factored in the lookup tables. In order to provide the required phase continuous tones, two index lookup tables may be used to switch between tables. These tables can also include phase compensations for the low pass filter phase response if needed.

The receive mode of the micro-controller 70 with the built-in FSK modem function and specifically, the demodulation of the received analog HART signals generated by a field device will be described below in greater detail.

In one embodiment, the FSK (HART) demodulation function is performed by the micro-controller 70 with the built-in FSK modem function in three sequential phases implemented in computer code: (1) zero crossing and amplitude detection;

(2) bit stream and timing generation, and (3) character generation and bit synchronization.

The first phase of the HART demodulation function is detection of the incoming signal's zero crossings using, in one embodiment, an 8-bit analog-to-digital converter (ADC) operating at 28.8 KHz. In effect, this configuration measures half of the two tones period with nominal 12 and 6.5 counts resolution. The ADC sampling frequency is precise and provides timing information for the generation of the bit stream derived from the incoming signal, because a bit is generated every 24 samples in order to decode bits at 1200 Hz. The zero crossings may be detected by sensing the waveform slope in two or three points around the zero values.

Next, the zero crossing widths stream feeds the bit stream decoder. The process uses a set of rules to re-create a zero (0) or one (1) bit based on a relatively short sequence of width values. The decode rules use each width value, a trend sequence, and the total width value. Special rules handle a long 2200 Hz tone sequence because this tone produces a fractional number of zero crossing transitions, thus managing the output of bits at the 1200 Hz rate.

In the third phase, the bit stream is converted into characters. The process may use the HART preamble sequence and the start bit to synchronize the bit stream to decode characters. Any other type of algorithm known in the art for synchronizing the bit stream so that decoded characters are correct may also be used.

The overall algorithm provides for quality demodulation by converting zero crossing values into a bit stream and then into characters. Besides a micro-controller, only an external band pass filter is utilized at the input of the ADC and a low pass filter is used to produce the FSK output.

Figure 3:
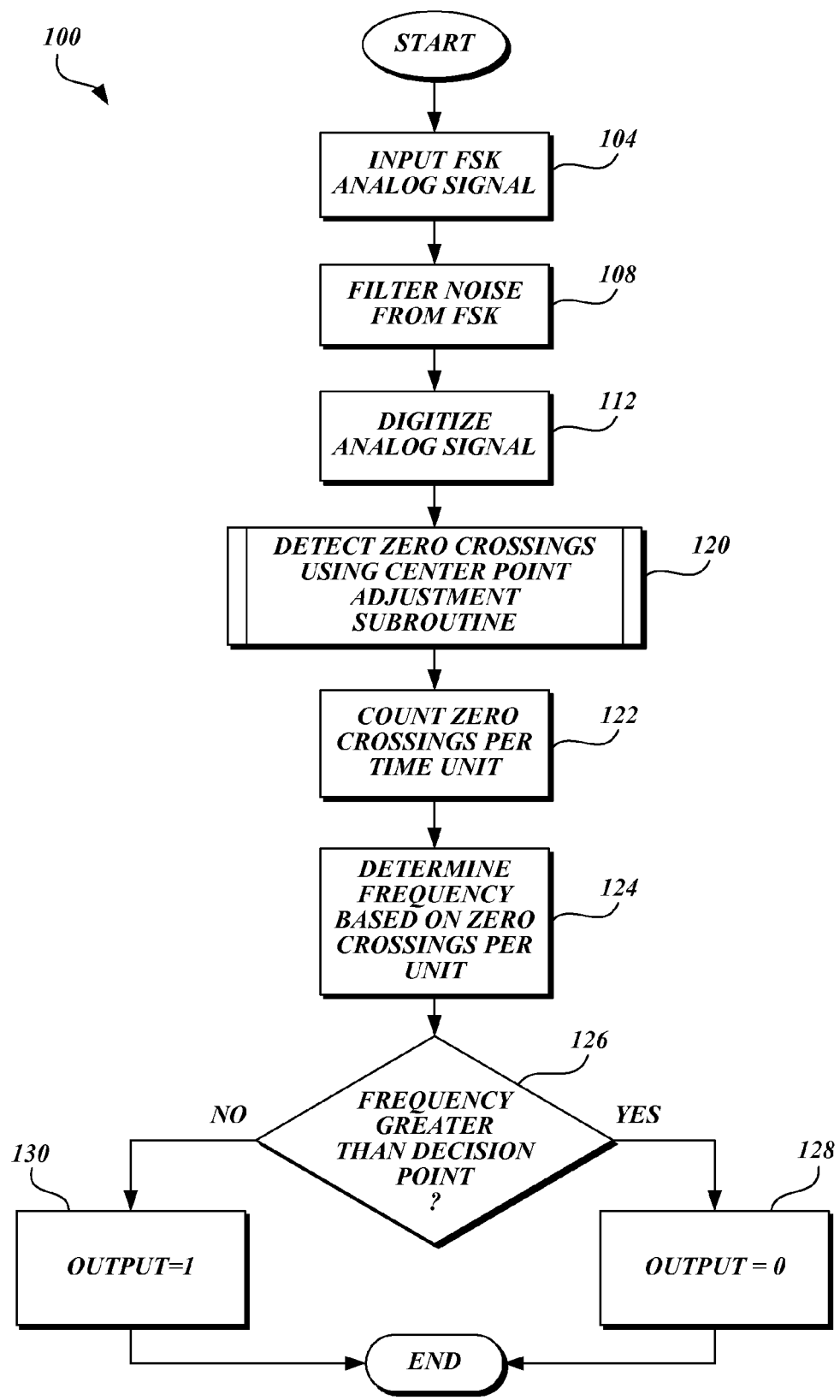
FIG. 3 is a process flow diagram illustrating the method for performing a demodulation of an analog FSK signal received from a field device by a micro-controller having a built-in software-implemented FSK modem function.

A method for performing a demodulation of an analog FSK signal received from a field device by a micro-controller having a built-in software-implemented FSK modem function is illustrated and will be described with reference to FIGS. 3-5. Referring now to the block diagram of the method 100 depicted in FIG. 3, at block 104, an FSK analog signal is sent to the micro-controller. In one embodiment, the FSK signal is filtered by a band pass filter that passes frequencies within a specified range and rejects frequencies outside that range, as shown at block 108. At block 112, the ADC converts the incoming signal into a digital value at a predetermined sample rate.

At block 120, the subroutine "Detect zero crossing using a center point adjustment" is engaged and the signal's "zero crossings" are detected. Zero-crossing is a commonly used term in the art. In mathematical terms, a "zero-crossing" is a point where the sign of a function changes (e.g., from positive to negative), represented by a crossing of the axis (zero value) in the graph of the function. In alternating current, the zero-crossing is the instantaneous point at which no voltage is present. In a sine wave or other simple waveform, this normally occurs twice during each cycle.

As one skilled in the art will appreciate, the zero-crossing is important for systems which send digital data over AC circuits. Counting zero-crossings is performed in signal processing to estimate frequencies of the received signal. The number of zero crossings per time unit determines the frequency of the signal, which in turn determines the binary value ("zero" or "one") of the converted signal.

In order to determine zero crossings, the subroutine 120 implements the adaptive center point algorithm as set forth below.

Figure 4A:
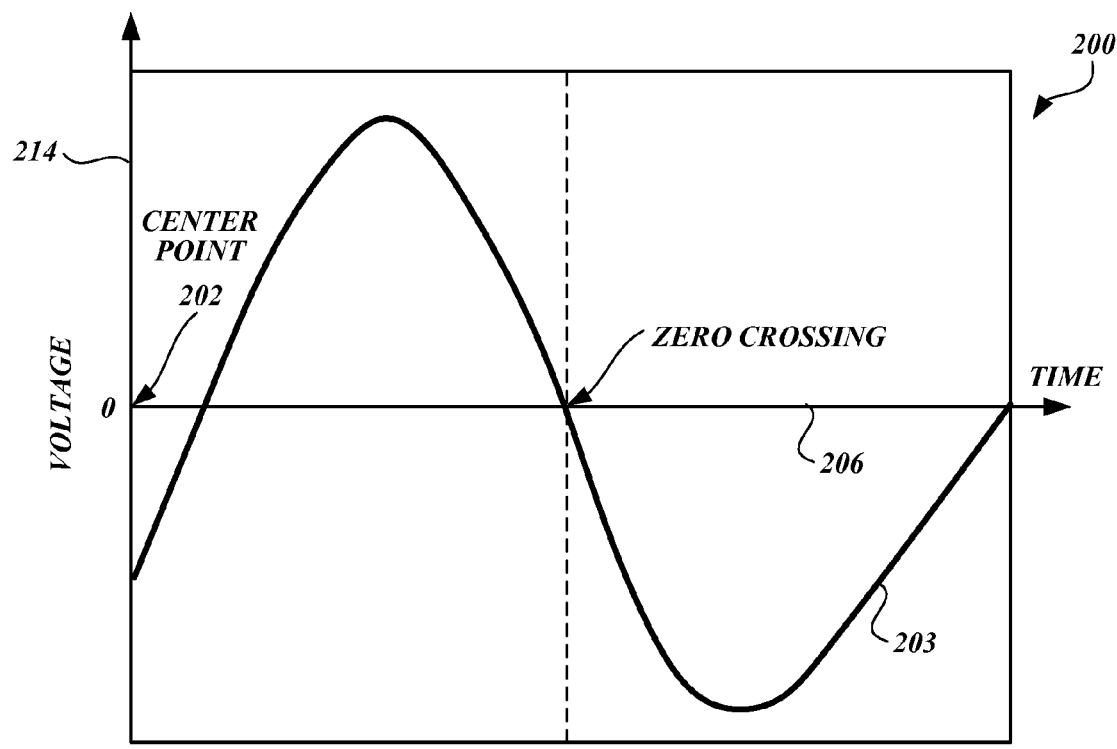
FIGS. 4A and 4B illustrate the shifting of the time axis of the graph depicting an incoming analog signal along the voltage ordinate to a center point value.
Figure 4B:
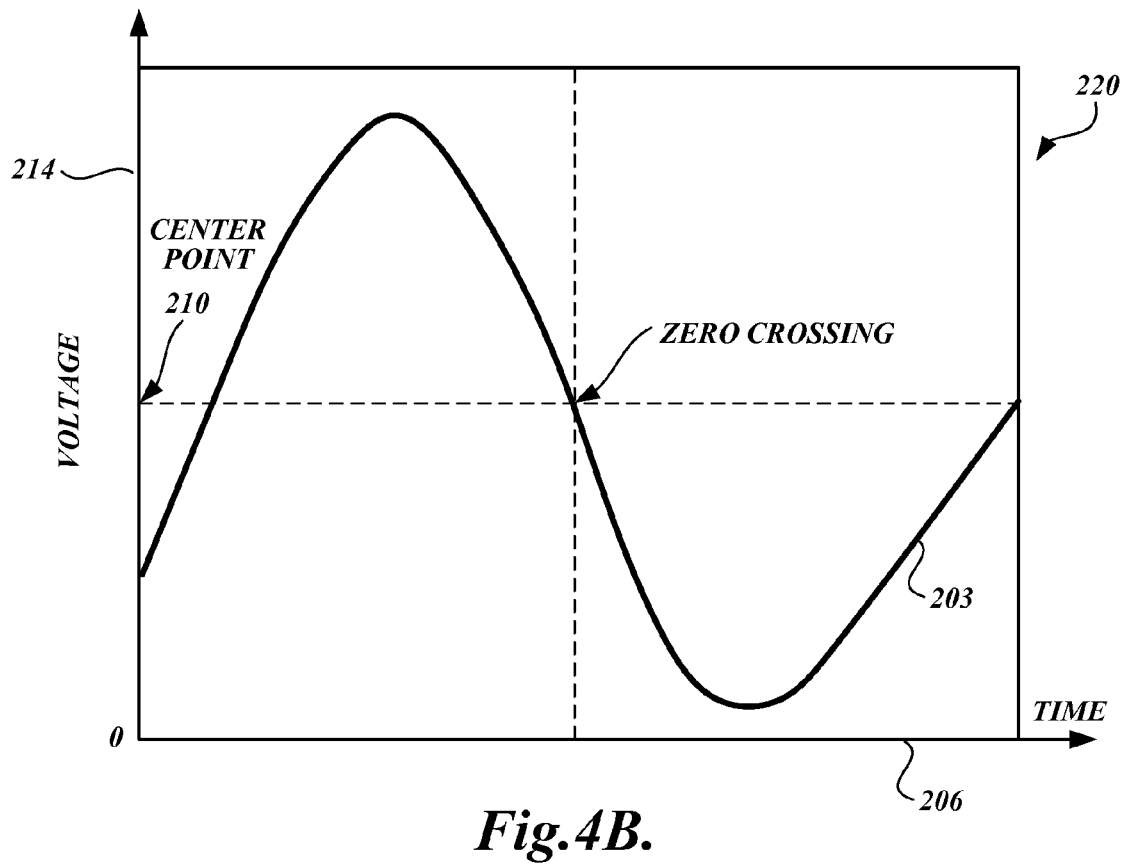
Figure 5:
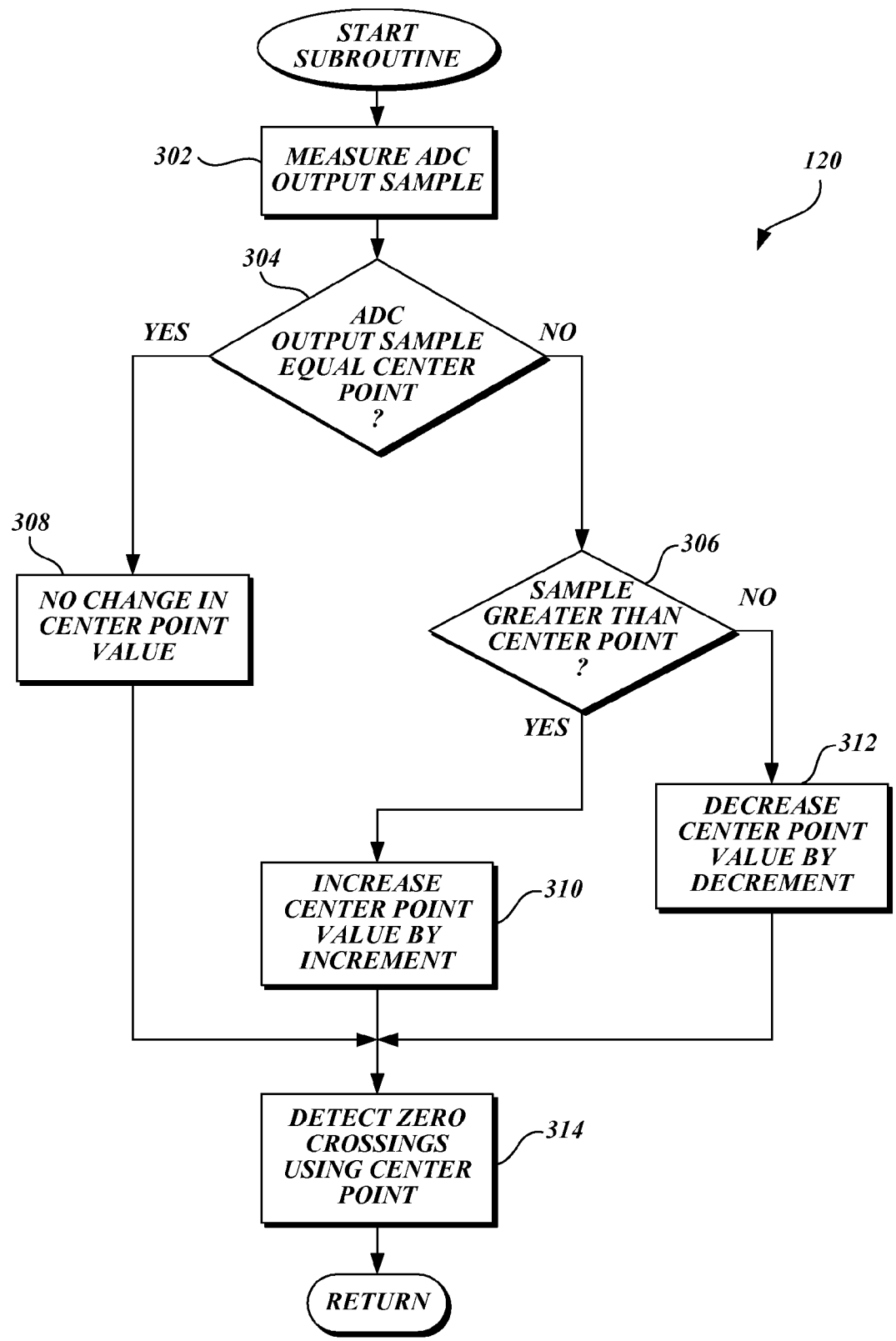
FIG. 5 is a process flow diagram illustrating a subroutine for detecting zero crossings.

Because the ADC operates on positive voltage values, in one embodiment between 0V and +5V, the sine wave 203 is "shifted" up along the Volt ordinate 214 in the graph of the function 200 (FIGS. 4A and 4B). Thus, the "zero" value of the time axis 206 effectively becomes a certain non-zero value 210 on the Volt ordinate 214 in the graph of the function 220, which hereinafter will be called a "center point" and illustrated in FIG. 4B (element 210).

In some embodiments, a center point may be a predetermined value set by a user depending on particular properties of the communication channel. However, setting a center point as a fixed value will not take into account the signal noise factors such as, for example, effects of heat, "jittering" created by hardware elements in the signal, and the like. Therefore, it would be beneficial to compensate for the changes in the center point value arising from the noise in the incoming signal. The adaptive center point algorithm that adjusts the center point value depending on the signal noise, implemented as the subroutine 120, is illustrated in FIG. 5 and described below.

At block 302, the ADC output is measured. At decision block 304, a comparison is made between the ADC output and the center point value that has been determined in the previous calculation cycle. If the current ADC output is equal to the current center point value, no change in center point value occurs. If the current ADC output is equal to the current center point value, no change in the center point value occurs (block 308). If the current ADC output is not equal to the current center point value, decision block 306 determines whether the ADC output is greater than the center point value. If the ADC output is determined to exceed the center point value, at block 310 the center point value is increased by a predetermined increment value. If the ADC output is determined to be less than the center point value, at block 312 the center point value is decreased by a predetermined decrement value. When the center point value adjustment has been made, zero crossings are detected at block 314, after which the subroutine returns.

Returning now again to FIG. 3, at block 122 the number of zero crossings per time unit is counted. In one embodiment, the time unit equals $\frac{1}{1200}$ seconds, i.e., approximately 0.8333 milliseconds. At block 124, frequency may be determined based on a number of zero crossings per unit. At decision block 126, it is determined whether the frequency exceeds a predetermined decision point value.

The decision point value is selected between the frequency values representing "zero" (2200 Hz) and "one" (1200 Hz). In an alternative embodiment, the decision point value determination may be made adaptive to compensate, for example, for a field device producing FSK signals outside of the accepted range, i.e., for the HART signal, outside of the range between 1200 Hz and 2200 Hz (+/−1-2%). For example, if a field were producing 1260/2310 Hz tones, the decision point could be adjusted to compensate for the tones below 1200 Hz and above 2200 Hz.

Returning to decision block 126, if the frequency is determined to be greater than a predetermined decision point, the output is determined to have a "zero" value at block 128. If the frequency value is less than a predetermined decision point value, the output is determined to have a value of "one" at block 130. After this determination has been accomplished, the process 100 ends.

In summary, the process 100 describes a demodulation of an analog FSK signal and its conversion into binary values in a micro-controller using a built-in software-implemented FSK modem function. While certain process steps have been described, those skilled in the art and others will recognize that these process steps may be altered without departing from the scope of the claimed subject matter.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for performing a demodulation of an analog FSK signal received from a field device by a micro-controller having a built-in software-implemented FSK modem function, the method comprising:
   receiving an FSK analog signal;
   converting the FSK analog signal into a digital value at a predetermined digital sample rate;
   determining the frequency of the digital value; and
   providing a digital binary signal based on the determined frequency of the digital value; wherein determining the frequency of the digital value signal further comprises:
   determining a sum of zero crossings per time unit;
   comparing the sum with a predetermined decision point value; and
   determining a value of the digital binary signal based on the result of the above comparison step; and
   wherein determining a sum of zero crossings per time unit includes:
   measuring output of the analog-to-digital converter;
   comparing the measured output to a predetermined center point value;
   when the measured output is greater than the predetermined center point value, increasing the center point value by a predetermined increment;
   when the measured output is less than the predetermined center point value, decreasing the center point value by a predetermined decrement; and
   determining a sum of zero crossings per time unit based on the determined center point value.

2. The method of claim 1, wherein the FSK analog signal is HART protocol compliant.

3. The method of claim 1, wherein the built-in FSK modem function is HART protocol compliant.

4. The method of claim 1, wherein the FSK analog signal is generated by a field device.

5. The method of claim 1, further comprising transmitting the digital binary signal to a programmable logic controller over an isolation barrier.

* * * * *